INVENTOR.
ALFRED WINKLER
WILFRIED HOFMANN
BY
Michael S. Striker

United States Patent Office 3,270,640
Patented Sept. 6, 1966

3,270,640
MANUALLY SETTABLE CAMERA WITH LIGHT-RESPONSIVE MEANS FOR AIDING IN THE SETTING OF THE CAMERA
Wilfried Hofmann and Alfred Winkler, Munich, Germany, assignors to Agfa Aktiengesellschaft, Leverkusen, Germany
Filed Mar. 5, 1964, Ser. No. 349,566
Claims priority, application Germany, Mar. 9, 1963,
A 42,551
15 Claims. (Cl. 95—10)

The present invention relates to cameras.

More particularly, the present invention relates to cameras which are adapted to be manually set, at least in part, and which include a built-in light meter forming part of a light-responsive means which responds to the lighting conditions for indicating to the operator when the camera has been properly set.

Cameras of the general type referred to above have required up to the present time special shutter assemblies to enable a light meter, for example, to be actuated by the settings of the exposure time and aperture so as to indicate to the operator when the camera has been properly set in accordance with the lighting conditions. The requirement of such special shutter assemblies of course increases the cost of the camera and in addition necessitates a rather poor use of the space which is available in the camera.

It is accordingly a primary object of the present invention to provide a camera with a conventional shutter assembly of the type which can conventionally be manually set to provide the exposure time and aperture but which at the same time is capable with the structure of the invention of cooperating with a light-responsive means for indicating to the operator when the camera has been properly set according to the lighting conditions, so that the invention it becomes possible to indicate with a light-responsive means when the camera has been properly set while using a conventional shutter assembly of simple construction of the type normally used simply for manual setting of the exposure time and aperture.

It is furthermore an object of the present invention to provide a structure which takes advantage of free space which in any event is available in the camera.

It is furthermore an object of the present invention to locate in this available free space in the interior of the camera elements which can be made of a relatively large size so that they can be constructed of a plastic material, for example, and can provide the required accuracy of operation without however requiring expensive manufacturing operations to achieve this accuracy, as a result of the relatively large size of the elements.

It is furthermore an object of the present invention to provide a structure capable of accomplishing the above objects and at the same time composed of simple rugged elements which provide a compact assembly which is reliable in operation.

With these objects in view the invention includes, in a camera, a pair of manually operable means for manually setting the exposure time and aperture. The camera of the invention also includes a totalizing screw means which is composed of a pair of rings in threaded engagement with each other. A support means supports these rings of the totalizing means for rotary movement about the optical axis and restrains one of the rings against axial movement while the other of the rings is free to move axially, and the structure of the invention includes a pair of motion transmitting rings respectively connecting the pair of manually operable means with the pair of rings of the totalizing means for turning these rings in response to actuation of the pair of manually operable means. The totalizing means automatically positions the axially movable ring thereof in an axial position determined by the combination of the settings provided by the pair of manually operable means. A light-responsive means indicates to the operator when the camera has been properly set according to the lighting conditions, and a third motion transmitting means cooperates with the axially movable ring of the totalizing means and the light-responsive means for actuating the latter in response to axial movement of the axially movable ring for indicating to the operator when the camera has been properly set according to the lighting conditions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
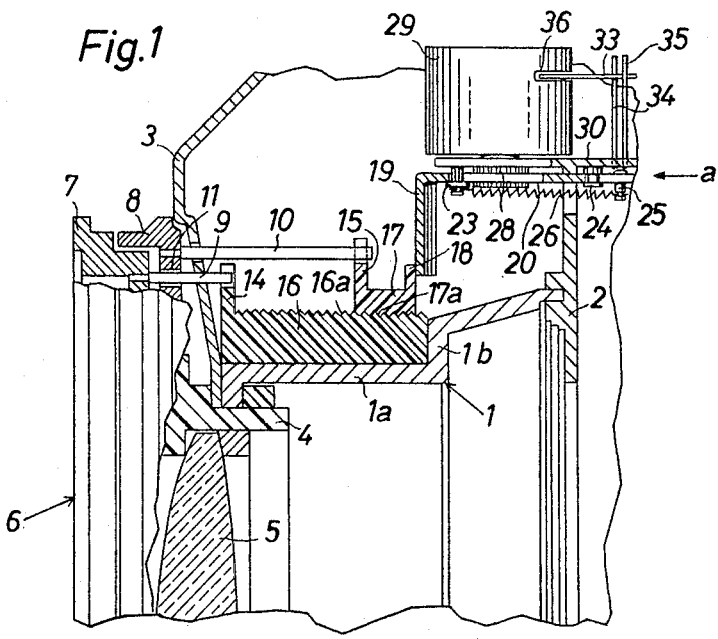
FIG. 1 is a fragmentary sectional elevational view of one possible embodiment of a structure according to the present invention, the section of FIG. 1 being taken in a plane which includes the optical axis.

Referring to FIG. 1, there is illustrated therein part of a camera which includes a light-guiding tube 1 for guiding light, which has passed through the objective, along the optical axis toward the focal plane where the film is exposed. This light-guiding tube 1 is carried by an intermediate wall 2 of the camera. The light-guiding tube 1 and the wall 2 form part of the basic frame structure of the camera which supports the various components of the camera, so that the tube 1 and the wall 2 form part of the support means which supports the structure of the invention. The camera further includes a front wall 3 which forms part of the camera housing. The light-guiding tube 1 carries the camera objective of which only a rear lens 5 is illustrated. The objective assembly also includes a shutter housing 6 which is carried by the light-guiding tube 1 and which serves to house a conventional shutter and diaphragm.

A pair of manually operable means 7 and 8 are provided for manually setting the exposure time and aperture, and this pair of manually operable means 7 and 8 are in the form for example, of rings which peripherally surround the shutter housing 6 and which are turnable relative thereto about the optical axis for setting the exposure time and aperture in a manner well known in the art.

The structure of the invention further includes a totalizing means 16, 17 formed by the rings 16, 17 which are in threaded engagement with each other, the inner threads 17a of the ring 17 engaging the exterior threads 16a of the ring 16, and it will be noted that this totalizing means 16, 17 is situated in a part of the camera housing where there is in any event available free space so that the totalizing means of the invention does not require the other parts of the camera to be rearranged so as to make room for the totalizing means, and furthermore because of the magnitude of this available free space it is possible to make the element 16 and 17 of a plastic material and of relatively large size so that these parts can be inexpensively manufactured without sacrificing accuracy. The support means which is formed in part by the light-guiding tube 1 supports the pair of rings 16 and 17 of the totalizing screw means for rotary movement about the optical axis. More specifically, it will be seen that the light-guiding tube 1 has a cylindrical portion 1a of circular configuration whose axis coincides with the optical axis, and the exterior cylindrical surface of this portion 1a of the light-guiding tube is slidably engaged by the inner cylindrical surface of the ring 16 so that in this way the support means supports the ring 16 for rotary movement about the optical axis, and of course the ring 17 is supported for rotary movement about the optical axis because of its threaded engagement with the ring 16. In addition, it will be noted that the support means includes a shoulder 1b of the light guiding-tube 1 and an inner surface portion of the front wall 3 of the camera which respectively engage opposite ends of the ring 16 so that the support means restrains the ring 16 against axial movement while freeing the ring 17 for axial movement.

Figure 3:
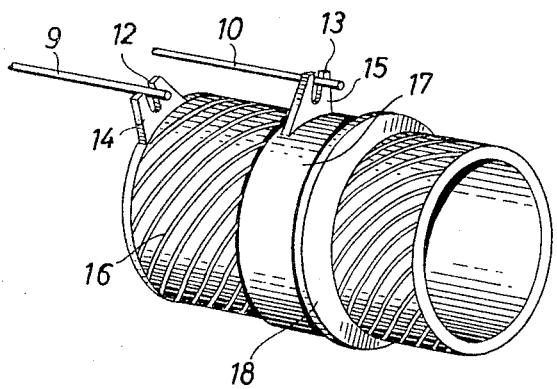
FIG. 3 is a perspective illustration of the transmission between the pair of manually operable means and the totalizing means.

A pair of motion transmitting means respectively connect the pair of manually operable means 7, 8 with the rings of the totalizing means, and this pair of motion transmitting means includes the pins 9 and 10 which extend parallel to the optical axis. The pair of manually operable means 7 and 8 are formed with openings which respectively receive ends of the pins 9 and 10 and these pins 9 and 10 are thus fixed to the rings 7 and 8, and the ring 8 is formed with an arcuate slot 11 extending along a circle whose center is in the optical axis so that the pin 9 can move freely along the slot 11 whenever the ring 7 is turned with respect to the ring 8 while the slot 11 will displace itself with respect to the pin 9 whenever the ring 8 is turned relative to the ring 7, and the slot 11 is made long enough so that there will be no interference with the pin 9 in all positions of the rings 7 and 8. In the same way, the front wall 3 of the camera housing is provided with arcuate slots through which the pins 9 and 10 respectively freely pass, and these latter slots are also extended along circles whose centers coincide at the optical axis of the camera and the lengths of these arcuate slots are long enough so that the pins 9 and 10 can be moved throughout the desired range of turning movement without any interference from the wall 3. In the illustrated example, which is shown most clearly in FIG. 3, the pair of motion transmitting means for transmitting actuation of the manually operable means 7 and 8 to the rings 16 and 17 includes a pair of lugs 14 and 15 which are respectively fixed to the rings 16 and 17 as by being formed integrally therewith, although they can be separate members rigidly fixed with the rings 16 and 17, respectively, and these lugs 14 and 15 are respectively formed with slots or notches 12 and 13 which extend radially with respect to the optical axis and which receive the elongated pins 9 and 10, so that with this construction the rotation of the rings 7 and 8 will of course be transmitted to the rings 16 and 17 for rotating the latter.

The structure also includes a light-responsive means which will indicate to the operator when the camera has been properly set in accordance with the lighting conditions, and this light-responsive means includes the galvanometer or the like 29 the moving coil of which is connected to the pointer 33 for positioning the latter according to the lighting conditions in a manner well known in the art, the galvanometer responding to the intensity of the light which is received by a photosensitive element such as a photocell, for example. This light-responsive means also includes an index assembly 32 with which the pointer 33 cooperates in a manner described in greater detail below.

A third motion transmitting means is provided to actuate the light-responsive means in response to axial movement of the axially movable ring 17, and this third motion transmitting means includes an elongated shiftable member 20 provided at its front end with a downwardly directed portion 19 which engages a rear flange 18 of the ring 17. The elongated shiftable member 20 is formed with elongated slots 21 and 22 through which stationary pins 23 and 24 forming part of the support means extend so as to guide the elongated shiftable member 20, which extends parallel to the optical axis, longitudinally in the direction of the optical axis. This third motion transmitting means include in addition to the longitudinally shiftable member 20 a spring which maintains the end 19 of the member 20 in engagement with the flange 18 of the ring 17, and this spring 26 is connected at one end to a pin 25 which is fixed to the elongated shiftable member 20 and at its opposite end to the stationary pin 23 which serves to participate in the longitudinal guiding of the shiftable member 20, as described above. The spring 26 urges the shiftable member 20 at all times in the direction of the arrow a (FIG. 1), and thus maintains the end 19 of member 20 in engagement with flange 18 so that the shiftable member 20 will necessarily follow the axial movement of the ring 17 and will have its axial position determined by the axial position of the ring 17.

This third motion transmitting means which includes the shiftable member 20 also includes an elongated rack 27 which in the illustrated example takes the form of a row of teeth formed directly along one edge of the shiftable member 20 so that in this way the rack 27 is fixed to the shiftable member 20 for longitudinal movement therewith, and this rack 27 meshes with a pinion 28 which is fixed to the lower end of a shaft which extends perpendicularly to the optical axis and which is supported by a stationary wall 30 of the support means for rotation about this axis which is perpendicular to the optical axis, this shaft carrying the galvanometer 29 so that the galvanometer 29 is turnable with the pinion 28 which turns in response to longitudinal shifting of the elongated member 20.

The extent to which the pointer 33 of the moving-coil instrument 29 can turn is limited by the length of the slot 36 of the galvanometer housing through which the pointer extends. The light-responsive means for indicating to the operator when the camera has been properly set includes in addition to the galvanometer and its pointer the index assembly referred to above, and this index assembly includes the pair of index marks 32 which are carried, for example, by a window 31 which is mounted in a suitable opening on the top wall of a cap on top of the camera and enclosing the elements such as the galvanometer 29, so that when the operator looks down through the window 31 it is possible to align the pointer 33 with the index marks 32. When the pointer 33 is situated between the pair of index marks 32 the operator knows that the camera has been properly set. In order to limit the extent of turning of the pointer 33 and thus maintain it at all times visible to the operator through the window 31 the wall 30 carries a pair of upwardly extending pins 34 and 35 between which the pointer 33 is located, so that the pointer 33 cannot turn beyond the space between the pins 34 and 35.

If the operator turns, for example, the exposure time setting ring 7, the pin 9 will transmit this turning movement through the member 14 to the threaded ring 16 of the totalizing screw means, and since the manually operable means 8 is maintained stationary by a known releasable detent structure or by being assembled with sufficient friction to prevent turning of the ring 8 except during manual turning thereof, the ring 17 will be maintained stationary with the ring 8 by cooperation of the pin 10 with the lug 15, and the result is that the turning of the ring 7 will turn the member 16 which since it cannot move axially will turn with respect to the ring 17 which will be displaced axially as a result of its threaded engagement with the ring 16. In this way the turning of the ring 7 will result in shifting of the ring 17 along the optical axis. This shifting of the ring 17 will of course be followed by the shiftable member 20 so that the galvanometer 29 will be automatically placed in an angular position determined by the turning of the ring 7.

The ring 7 is turned by the operator until the pointer 33 is situated between the index marks 32, as described above, and then the operator will know that the camera has been properly set. Of course, it is possible to achieve the same result of properly positioning the pointer 33 simply by turning the ring 8 so that the adjustment can be brought about only by changing the aperture, if desired. The turning of the ring 8 will result in turning of the ring 17 with respect to the ring 16 which remains stationary, and this turning of the ring 17 will of course result in an axial movement thereof which will also cause the pointer 33 to be shifted, and the operator will continue the adjustment until the pointer 33 is positioned with respect to the index assembly 32 so as to indicate that the camera has been properly set according to the lighting conditions. The ring 7 is also held by a releasable detent structure or by frictional engagement with other elements so that it cannot turn when the operator manually turns only the ring 8. Of course, it is possible also to turn both of the rings 7 and 8 to provide any desired combination of settings which will be known to provide a proper exposure when the operator notes that the settings have positioned pointer 33 between the pair of index marks 32. It is therefore apparent that with the above-described structure the totalizing means will automatically provide the axially movable ring 17 with an axially position which is determined by the combination of the settings provided by the pair of manually operable means 7 and 8, and therefore the motion transmitting means between the axially movable ring 17 and the light-responsive means 29, 32, 33 will actuate the latter to indicate to the operator when the camera has been properly set in accordance with the manipulations of the pair of manually operable means 7 and 8.

Of course, instead of turning the entire moving coil instrument 29 by way of the longitudinal movement of the member 20, it is possible to provide a galvanometer which is turned only to set into the camera the factor of the speed of the film which is used therein, for example, and instead the longitudinal shifting movement of the member 20 can be used to turn a follow-up pointer which has its position aligned with the pointer 33 of the galvanometer so as to indicate to the operator when the camera has been properly set, and such cooperation between a follow-up pointer and a galvanometer pointer is also well known in the art.

Figure 4:
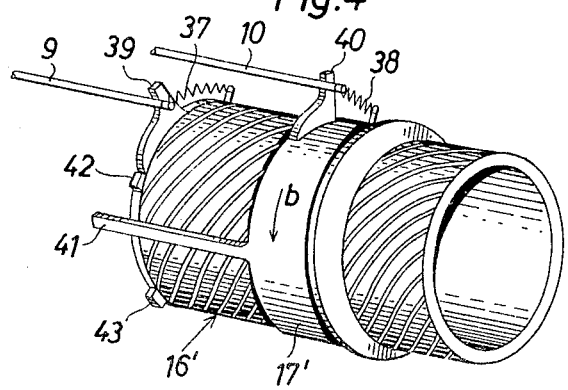
FIG. 4 is a prespective illustration of another embodiment of the transmission between the pair of manually operable means and the totalizing means.

It will be noted that with the above-described structure the pair of manually operable means are connected through the pair of motion transmitting means which respectively include the pins 9 and 10 to the pair of rings 16 and 17 in such a way that these rings 16 and 17 necessarily turn in both directions through precisely the same angles as the rings 7 and 8. A different embodiment of a pair of motion transmitting means between the pair of manually operable means 7, 8 and the pair of rings of the totalizing means is illustrated in FIG. 4. In the embodiment of FIG. 4 the pair of pins 9 and 10, connected in a manner described above to the rings 7 and 8, are respectively connected with springs 37 and 38 which are in turn connected to pins which are respectively fixed to the rings 16' and 17' of the totalizing means, so that these springs 37 and 38 urge the rings 16' and 17' to turn in the direction of the arrow b indicated in FIG. 4. These threaded rings 16, 17 fixedly carry stop projections 39 and 40 which may be formed integrally with these rings, respectively, and thus the springs 37 and 38 maintain the projections 39 and 40 in engagement with the pins 9 and 10 so that as the latter turn with the rings 7 and 8 the rings 16' and 17' will follow the turning movement of these rings.

This embodiment includes a limiting means which limits the extent of angular movement of the axially movable ring 17'. This limiting means includes an elongated arm 41 extending parallel to the optical axis and fixed to the ring 17' as by being formed integrally therewith, and a pair of stop members 42 and 43 are situated on opposite sides of the arm 40 while in the path of turning movement thereof so as to engage the arm 41 at the ends of the range of angular turning of the ring 17' provided by the limiting means 41–43. These stop projections 42 and 43 are fixedly carried by the ring 16' as by being formed integrally therewith, so that the limiting means 41–43 limits the extent to which the rings 16' and 17' can turn angularly one relative to the other.

If the ring 8 is turned, during adjusting of the aperture, so as to turn the ring 17' in the direction of the arrow b, then of course the motion transmitting means 10, 38, 40 will cause the ring 17' to follow the turning of the ring 8. However, after a given extent of turning of the ring 17' the arm 41 will engage the stop member 43, and at this time further turning of the ring 8 will only cause the spring 38 to become stretched without any further turning of the ring 17' of the totalizing screw means.

Figure 2:
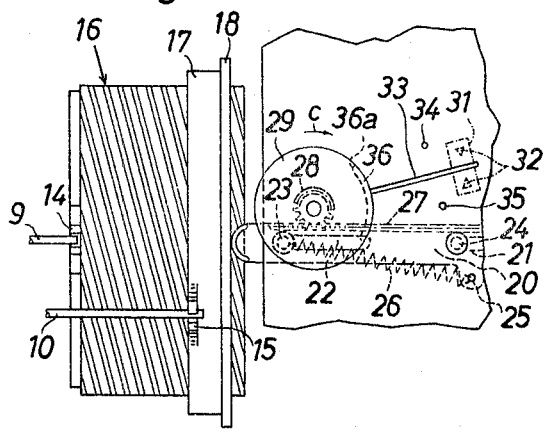
FIG. 2 is a top plan view of the structure of the invention illustrating how the light-responsive means is actuated by the totalizing means.

With such a construction it is possible to avoid injury to elements of the light-responsive means which indicates to the operator the proper setting of the camera. This construction is particularly of advantage when the total of the possible movements which can be provided by the rings 7 and 8 will call for an angular turning of the instrument 29 which exceeds the extent of angular turning of the points 33 which is determined by the length of the slot 36 of the housing of the galvanometers. Such an occurrence may take place in the case when one of the manually operable means 7 and 8 is constructed in a known way of a pair of rings or discs turnable one relative to the other for the purpose of introducing into the camera the factor of the speed of the film which is used therein. With such a construction it is possible, for example, that the end 36a (FIG. 2) of the slot 36 and the pointer 33 are already in engagement with each other while it is still possible to provide further turning of the instrument 29 in the direction of the arrow c, shown in FIG. 2. With such an arrangement the pointer 33 would simultaneously engage the end 36a of the slot 36 and the stop-pin 35 while the continued turning of the galvanometer 29 in the direction of the arrow c would simply result in undesirable bending of the pointer 33, and the limiting structure of FIG. 4 together with the pair of motion transmitting means which permit turning of the rings 7 and 8 beyond the range of possible actuation of the light-responsive means which can be carried out without injuring the latter.

It will be understood that each of the elements described above, or two or more together, may also find a useful application in other types of cameras differing from the types described above.

While the invention has been illustrated and described as embodied in semi-automatic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a pair of manually operable means for respectively setting the exposure time and aperture of the camera; totalizing screw means including a pair of rings in threaded engagement with each other; support means supporting said rings for rotation about the optical axis and restraining one of said rings against axial movement so that the other of said rings is free to rotate and move axially; a pair of motion transmitting means operatively connected to said pair of manually operable means, respectively, and said pair of rings of said totalizing means, respectively, for respectively turning said rings in response to operation of said pair of manually operable means, and said totalizing means placing said axially movable ring thereof in an axial position determined by the combination of the settings provided by said pair of manually operable means; light-responsive means for indicating the proper setting of the camera in accordance with the lighting condition; and third motion transmitting means operatively connected to said light-responsive means and responding to axial movement of said axially movable ring for actuating said light-responsive means to indicate to the operator when siad pair of manually operable means have provided the camera with settings appropriate for the lighting conditions.

2. In a camera, in combination, a camera housing; a light-guiding tube located in said housing for guiding light along the optical axis; a pair of manually operable means located at the exterior of said housing for manually setting the exposure time and aperture, respectively; totalizing screw means located in said housing and including a pair of rings in threaded engagement with each other; support means formed at least in part by part of said light-guiding tube and supporting said rings for rotation about the optical axis while restraining one of said rings against axial movement while the other of said rings is free to move axially; a pair of motion transmitting means respectively connecting said pair of manually operable means with said pair of rings for respectively turning the latter in response to actuation of said pair of manually operable means to set the exposure time and aperture, respectively, said totalizing means providing said axially movable ring thereof with an axial position determined by the combination of the settings of said pair of manually operable means; light-responsive means for indicating to the operator when the camera has been properly set according to the lighting conditions; and third motion transmitting means cooperating with said axially movable ring and with said light-responsive means for actuating the latter in response to axial movement of said axially movable ring for indicating to the operator when the camera has been set properly in accordance with the lighting conditions.

3. In a camera, in combination, a light-guiding tube for guiding light for movement along the optical axis and having a portion which is at least in part of a circular configuration; a pair of manually operable means for respectively setting the exposure time and aperture; totalizing screw means including a pair of rings in threaded engagement with each other; support means supporting said rings for rotary movement while maintaining one of said rings against axial movement while the other of said rings is free to move axially, said light-guiding tube forming part of said support means and supporting said one ring which is restrained against axial movement for rotation about the optical axis; a pair of motion transmitting means respectively connecting said pair of manually operable means with said pair of rings for respectively turning the latter in response to actuation of said pair of manually operable means, said totalizing means automatically providing said axially movable ring with an axial position determined by the combination of the settings provided by said pair of manually operable means; light-responsive means for indicating to the operator when the camera has been properly set according to the lighting conditions; and third motion transmitting means co-operating with said axially movable ring and said light-responsive means for actuating the latter in response to axial movement of said axially movable ring for indicating to the operator when the camera has been properly set by manipulation of either one or both of said pair of manually operable means.

4. In a camera, in combination, a light-guiding tube for guiding light along the optical axis; a housing carried by said tube and adapted to accommodate in its interior the shutter and diaphragm of the camera; a pair of manually operable means for respectively setting the shutter and diaphragm to provide selected exposure times and apertures, respectively; totalizing screw means including a pair of rings in threaded engagement with each other; support means supporting said rings for rotation about the optical axis and restraining one of said rings against axial movement while freeing the other of said rings for axial movement, said support means being formed at least in part by part of said light-guiding tube about which said rings are turnable; a pair of motion transmitting means respectively connecting said pair of manually operable means with said pair of rings for respectively turning the latter in response to actuation of said pair of manually operable means, said totalizing means automatically positioning said axially movable ring in an axial position determined by the combination of the settings of the shutter and diaphragm provided by said pair of manually operable means, respectively; light-responsive means for indicating to the operator when the camera has been properly set according to the lighting conditions; and third motion transmitting means cooperating with said axially movable ring and said light-responsive means for actuating the latter in response to axial movement of said axially movable ring to indicate to the operator when the camera has been properly set.

5. In a camera, in combination, a pair of manually operable means for respectively manually setting the exposure time and aperture of the camera; totalizing screw means including a pair of rings in threaded engagement with each other; support means supporting said rings for rotation about the optical axis and restraining one of said rings against axial movement while freeing the other of said rings for axial movement; a pair of motion transmitting means connecting said pair of manually operable means, respectively, to said pair of rings for respectively turning the latter in response to operation of said pair of manually operable means, said pair of motion transmitting means including a pair of elongated pins extending parallel to the optical axis respectively between said pair of manually operable means and said rings, said totalizing means automatically positioning said axially movable ring in an axial position determined by the combination of the settings provided by said pair of manually operable means; light-responsive means for indicating to the operator when the camera has been properly set according to the lighting conditions; and third motion transmitting means cooperating with said axially movable ring and said light-responsive means for actuating the latter in response to axial movement of said axially movable ring to indicate to the operator when the camera has been properly set according to the lighting conditions.

6. In a camera as recited in claim 5, the motion transmitting means for said axially movable ring including a member fixed to said ring and formed with a cutout and said pin of said latter motion transmitting means extending into said cutout and being fixed with one of said manually operable means.

7. In a camera as recited in claim 5, said pins of said pair of motion transmitting means being respectively fixed with said pair of manually operable means and said pair of motion transmitting means including a pair of springs respectively connecting said pins with said pair of rings and a pair of stop members respectively fixed to said rings and urged by said springs into engagement with said pins so that said rings will have angular positions determined by the actuation of said pair of manually operable means.

8. In a camera, in combination, a pair of manually operable means for respectively setting the exposure time and aperture; totalizing screw means including a pair of rings in threaded engagement with each other; support means supporting said rings for rotation about the optical axis and restraining one of said rings against axial movement while freeing the other of said rings for axial movement; a pair of motion transmitting means respectively connecting said pair of manually operable means with said pair of rings for turning the latter in response to actuation of said pair of manually operable means, said totalizing means automatically positioning said axially movable ring in an axial position determined by the combination of the settings provided by said pair of manually operable means; limiting means cooperating with said axially movable ring for limiting the extent of angular movement thereof; light-responsive means for indicating to the operator when the camera has been properly set according to the lighting conditions; and third motion transmitting means cooperating with said axially movable ring and said light-responsive means for actuating the latter in response to axial movement of said axially movable ring for indicating to the operator when the camera has been properly set according to the lighting conditions.

9. In a camera as recited in claim 8, said limiting means including an elongated arm fixed to said axially movable ring for turning movement therewith and a pair of stop members carried by said one ring which is restrained against axial movement by said support means and situated on opposite sides of said arm in the path of turning movement thereof to engage said arm when said axially movable ring reaches the limits of the angular movement provided by said limiting means.

10. In a camera, in combination, a pair of manually operable means for respectively setting the exposure time and aperture of the camera; totalizing screw means including a pair of rings in threaded engagement with each other; support means supporting said rings for rotation about the optical axis and restraining one of said rings against axial movement while freeing the other of said rings for axial movement; a pair of motion transmitting means respectively connecting said pair of manually operable means with said pair of rings for respectively turning the latter in response to actuation of said pair of manually operable means, said totalizing means automatically positioning said axially movable ring in an axial position determined by the combination of the settings provided by said pair of manually operable means; light-responsive means for indicating to the operator when the camera has been properly set according to the lighting conditions; an elongated member extending substantially parallel to the optical axis and having an end which engages part of said axially movable ring, said support means supporting said elongated member for longitudinal movement; spring means urging said member toward said axially movable ring so that said elongated member will have an axial position corresponding to the axial position of said axially movable ring and will move axially therewith; and means actuating said light-responsive means in response to longitudinal movement of said elongated member for indicating to the operator when the camera has been properly set according to the lighting conditions.

11. In a camera, in combination, a pair of manually operable means for respectively setting the exposure time and aperture of the camera; totalizing screw means including a pair of rings in threaded engagement with each other; support means supporting said rings for rotation about the optical axis and restraining one of said rings against axial movement while freeing the other of said rings for axial movement; a pair of motion transmitting means respectively connecting said pair of manually operable means with said rings for turning the latter about the optical axis in response to actuation of said pair of manually operable means, said totalizing means automatically positioning said axially movable ring in an axial position determined by the combination of the settings provided by said pair of manually operable means; an elongated shiftable member extending parallel to the optical axis and having an end in engagement with said axially movable ring, said support means supporting said elongated shiftable member for longitudinal movement; spring means urging said shiftable member into engagement with said axially movable ring so that said shiftable member shifts in response to axial movement of said axially movable ring so as to also have an axial position determined by the combination of the settings of said pair of manually operable means; elongated rack means extending longitudinally along said shiftable member and fixedly carried thereby for shifting movement therewith, light-responsive means including a rotary member supported by said support means for rotation about an axis perpendicular to the optical axis; a pinion fixed to said rotary member of said light-responsive means for rotation therewith about the axis perpendicular to the optical axis and meshing with said rack means so that said member of said light-responsive means will have an angular position determined by the combination of the settings of said pair of manually operable means, and said angular position of said member of said light-responsive means indicating to the operator when the camera has been properly set according to the lighting conditions.

12. In a camera as recited in claim 11, said rotary member turnable about said axis perpendicular to the optical axis being a galvanometer which carries a pointer and said light-responsive means including a stationary index means with respect to which said pointer is aligned to indicate to the operator when the camera has been properly set.

13. In a camera, in combination, a pair of manually operable means for respectively setting the aperture and exposure time of the camera; totalizing screw means including a pair of plastic rings in threaded engagement with each other; support means supporting said rings for rotation about the optical axis and restraining one of said rings against axial movement while freeing the other of said rings for axial movement; a pair of motion transmitting means respectively connecting said pair of manually operable means with said pair of rings for turning the latter in response to actuation of said pair of manually operable means, said totalizing means automatically positioning said axially movable ring in an axial position determined by the combination of the settings provided by said pair of manually operable means; light-responsive means for indicating to the operator when the camera has been properly set according to the lighting conditions; and third motion transmitting means cooperating with said axially movable ring and said light-responsive means for actuating the latter in response to axial movement of said axially movable ring for indicating to the operator when the camera has been properly set according to the lighting conditions.

14. In a camera, in combination, a camera housing; a light-guiding tube located in said camera housing for directing light along the optical axis; a shutter housing carried by said tube and adapted to house a shutter and diaphragm; an objective also carried by said tube; a pair of manually operable means located adjacent said shutter housing for respectively setting the diaphragm and shutter located therein; totalizing screw means including a pair of rings in threaded engagement with each other and supported by said tube for rotary movement about the optical axis, said tube and part of said camera housing restraining one of said rings against axial movement while freeing the other of said rings for axial movement; a pair of motion transmitting means respectively connecting said pair of manually operable means to said pair of rings for turning the latter in response to actuation of said pair of manually operable means, said totalizing means automatically positioning said axially movable ring in an axial position determined by the combination of the settings of said pair of manually operable means; light-responsive means for indicating to the operator when the camera has been properly set according to the lighting conditions; and third motion transmitting means cooperating with said axially movable ring and said light-responsive means for actuating the latter in response to axial movement of said axially movable ring for indicating to the operator when the camera has been properly set according to the lighting conditions.

15. In a camera as recited in claim 14, said pair of manually operable means being carried by said shutter housing for rotation about the optical axis.

References Cited by the Examiner

UNITED STATES PATENTS

| | | | |
|---|---|---|---|
| 2,467,946 | 4/1949 | Rossman et al. | 95—10 |
| 2,999,437 | 9/1961 | Hahn et al. | 95—10 |
| 3,086,432 | 4/1963 | Werrmann | 95—10 |
| 3,089,397 | 5/1963 | Starp | 95—10 |

NORTON ANSHER, *Primary Examiner.*